(12) United States Patent
Bousquet et al.

(10) Patent No.: US 9,389,650 B2
(45) Date of Patent: Jul. 12, 2016

(54) DEVICE FOR PROVIDING PROTECTION AGAINST INTRUSION FOR AN ELECTRONIC COMPONENT

(71) Applicant: OBERTHUR TECHNOLOGIES, Colombes (FR)

(72) Inventors: Nicolas Bousquet, Colombes (FR); Christophe Giraud, Colombes (FR); Nicolas Morin, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/589,500

(22) Filed: Jan. 5, 2015

(65) Prior Publication Data

US 2015/0192969 A1 Jul. 9, 2015

(30) Foreign Application Priority Data

Jan. 6, 2014 (FR) ...................... 14 50044

(51) Int. Cl.
*G08B 13/00* (2006.01)
*G06F 1/18* (2006.01)
*G06F 21/86* (2013.01)
*G06F 21/55* (2013.01)

(52) U.S. Cl.
CPC .............. *G06F 1/182* (2013.01); *G06F 21/558* (2013.01); *G06F 21/86* (2013.01)

(58) Field of Classification Search
None
See application file for complete search history.

(56) References Cited

U.S. PATENT DOCUMENTS 3,120,654 A * 2/1964 Lee ...................... G08B 13/187
250/235
4,893,005 A * 1/1990 Stiebel ...................... G01V 8/18
250/221

7,295,831 B2 * 11/2007 Coleman ................ H04B 7/086
455/13.3
7,953,389 B2 * 5/2011 Coleman ................ H04B 7/086
455/13.3
8,508,366 B2 * 8/2013 Petricoin, Jr. ....... G06K 9/00771
340/541
2005/0039040 A1 2/2005 Ransom et al.
2015/0269805 A1 * 9/2015 Korala .................... G06F 21/86
713/194

FOREIGN PATENT DOCUMENTS

DE 10 2012 020933 5/2013
EP 2 549 404 1/2013
WO 2011/032829 3/2011

OTHER PUBLICATIONS

Search Report dated Sep. 17, 2014 from French Patent Application No. 1450044, p. 1.

* cited by examiner

*Primary Examiner* — Julie Lieu
(74) *Attorney, Agent, or Firm* — MH2 Technology Law Group, LLP

(57) ABSTRACT

Devices for providing protection against intrusion in order to protect at least one electronic component. One example of the device includes an enclosure, surrounding the electronic component, which is proof against a specific type of radiation, and at least one piece of equipment selected from a receiver and a transmitter of radiation of that specific type, which is arranged inside the enclosure and substantially tuned to another piece of equipment that is complementary and disposed outside the enclosure. The device also includes a detection module suitable for detecting an intrusion if at least one receiver receives radiation of that specific type.

14 Claims, 3 Drawing Sheets

DEVICE FOR PROVIDING PROTECTION AGAINST INTRUSION FOR AN ELECTRONIC COMPONENT

CROSS-REFERENCE TO RELATED APPLICATIONS

This application claims priority to French Application No. 1450044 filed 6 Jan. 2014, the entire disclosure of which is hereby incorporated by reference in its entirety.

The present invention relates to the field providing an electronic component with protection against intrusion.

When an electronic component performs a function that is critical, such as for example storing and/or controlling access to confidential data, such a component is potentially the target for attempted intrusion. The purpose of an intrusion is to be able to access as closely as possible to said electronic component in order to be able to spy on its behavior and/or its content, by physical contact and/or electrical contact, or merely by close proximity, using induction, or indeed to modify said behavior, e.g. by means of a pulse attack (an electromagnetic frequency attack (EFMA)).

Since such an intrusion can be very harmful, depending on the critical nature of the electronic component, it is appropriate to protect the electronic component against such an attempted intrusion. Such protection comprises a first step of detecting such an attempted intrusion, and possibly followed by at least one step of conservation action.

In order to detect such an attempted intrusion, numerous mechanical and electronic means have been proposed.

The present invention presents a novel approach for detecting an attempted intrusion, which is more particularly adapted to electronic components arranged in a protective enclosure that is proof against a type of radiation, e.g. electromagnetic radiation.

The invention provides a device for providing protection against intrusion in order to protect at least one electronic component, the device comprising a first enclosure surrounding the electronic component and proof against a type of radiation, at least one piece of equipment from a receiver and a transmitter of radiation of said type arranged inside the first enclosure, and substantially tuned to another piece of equipment that is complementary and selected from a receiver and a transmitter arranged outside the first enclosure, and a detection module suitable for detecting an intrusion if at least one receiver receives radiation of said type.

According to another characteristic, the type of said radiation comprises at least one type selected from light radiation, radiofrequency radiation, and ultrasound radiation.

According to another characteristic, the first enclosure comprises a first box that is closed to said radiation on all of its faces except for a remaining face, said remaining face being closed to said radiation by a plane support.

According to another characteristic, the radiation is radiofrequency radiation and the support comprises a ground plane at the same potential as the first box.

According to another characteristic, the equipment arranged outside the first enclosure is itself arranged inside a second enclosure that comprises a second box secured to the first box.

According to another characteristic, the first box and/or the second box provides protection against electromagnetic radiation.

According to another characteristic, the equipment arranged inside the first enclosure is a receiver that is substantially tuned to a preexisting transmitter in the environment of the electronic component and outside the first enclosure.

According to another characteristic, the detection module is suitable for detecting an intrusion of penetration type if at least one receiver receives radiation of amplitude greater than a first threshold for noise.

According to another characteristic, the detection module is suitable for detecting an intrusion of penetration type if at least one receiver receives radiation of amplitude less than the amplitude of a radiofrequency signal transmitted by a transmitter.

According to another characteristic, the detection module is suitable for detecting an intrusion of pulse attack type if at least one receiver receives radiation of amplitude greater than the amplitude of radiation transmitted by a transmitter.

According to another characteristic, the device further includes an action module, suitable for taking a first conservation measure if an intrusion of penetration type is detected.

According to another characteristic, the action module is also suitable for taking a second conservation measure if an intrusion of electromagnetic attack type is detected.

The invention also provides electronic equipment including such a device for providing protection against intrusion.

According to another characteristic, the electronic equipment is a mobile terminal.

Other characteristics, details, and advantages of the invention appear more clearly from the detailed description given below by way of indication and with reference to the drawings, in which:

FIGS. 1, 2, 4, and 5 are plan views of different embodiments of the invention;

An electronic component that performs a critical function, such as for example storing and controlling access to confidential data, is a potential target for attempts at intrusion. By way of example, such an electronic component may be a processor performing secure operations, such as a processor of the trusted execution environment (TEE) type. It may also be a volatile or non-volatile memory that stores sensitive code, such as a cryptographic program, or sensitive data such as a cryptographic key, a personal identification number (PIN), etc.

Figure 1:
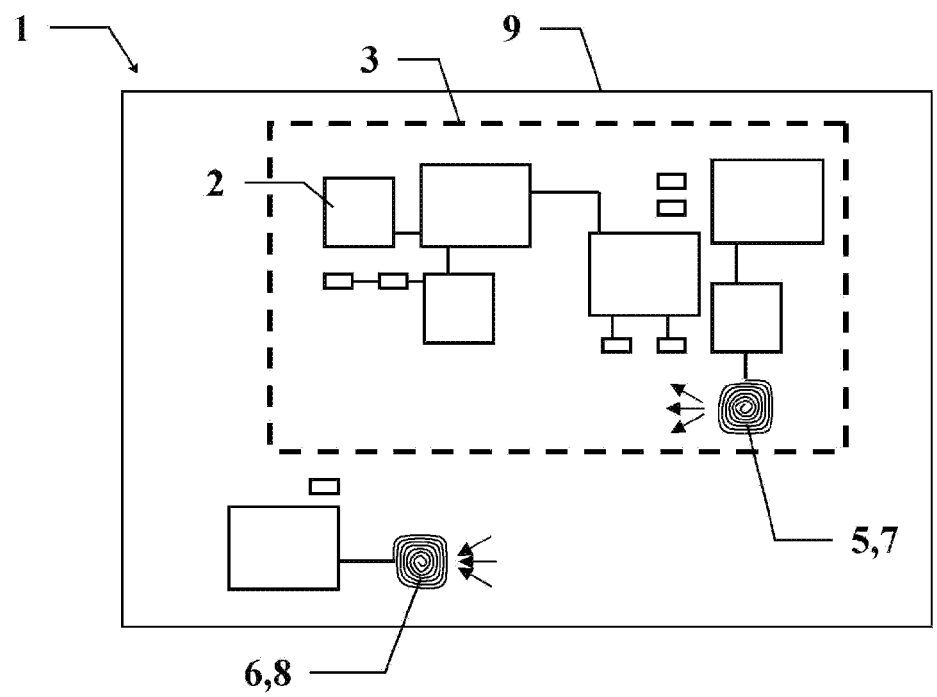
FIG. 1 shows a typical environment of the invention. In the embodiment shown, a protection device 1 is suitable for protecting at least one electronic component 2 against intrusion.
Figure 2:
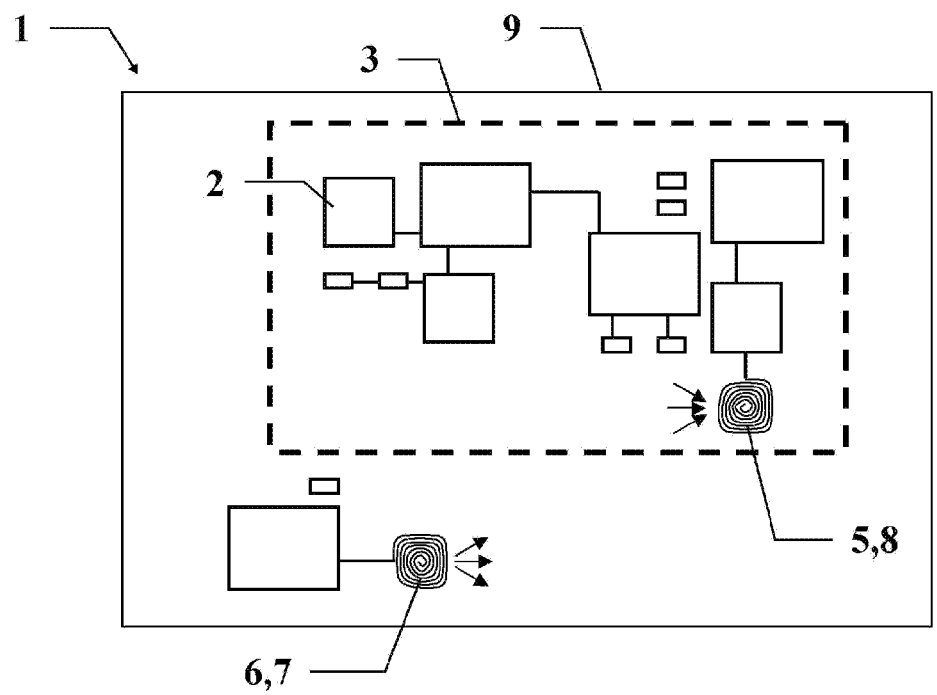
Figure 3:
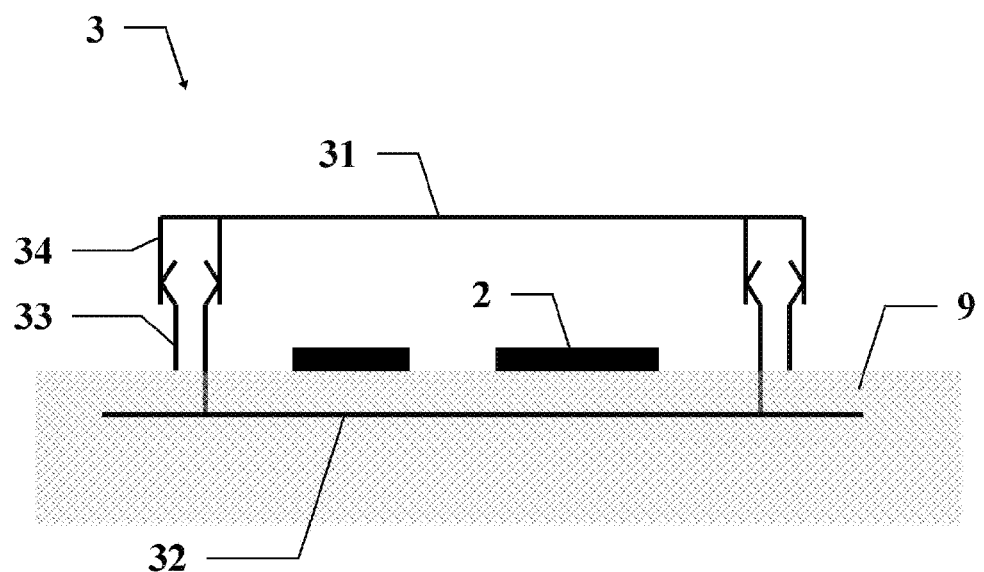
FIG. 3 is a profile view in section showing an embodiment of the invention.

For this purpose, said at least one electronic component 2 is arranged in an enclosure 3 that is proof against at least one type of radiation. Said enclosure 3 surrounds said at least one electronic component 2. The principle of the protection device 1 is to place at least one piece of equipment 5, a transmitter or a receiver, inside the enclosure 3, and to place at least one other piece of equipment 6, a receiver or a transmitter, outside the enclosure 3, the first piece of equipment 5 and the second piece of equipment 6 being complementary and substantially tuned to each other. Thus, as shown in FIG. 1, if the first piece of equipment 5 is a transmitter 7, the second piece of equipment 6 is a receiver 8 that is substantially tuned thereto, in that it is suitable for receiving radiation 11 transmitted by the first piece of equipment 5. As shown in FIG. 2, in a dual manner that is equivalent, if the second piece of equipment 6 is a transmitter 7, then the first piece of equipment 5 is a receiver 8 that is substantially tuned thereto in that it is suitable for receiving radiation 11 transmitted by the second piece of radiofrequency (RF) equipment 6. Said radiation is advantageously structured as a signal. A receiver is said to be tuned in that it is suitable for receiving said radiation and, where appropriate, for extracting the signal therefrom.

Under all circumstances, at least one transmitter 7 and at least one complementary receiver 8 are arranged on either side of the enclosure 3. It follows that it is possible to detect two different situations. If the enclosure 3 is closed, with all of its portions intact and in place, then the receiver 8 cannot receive the radiation transmitted by the transmitter 7. On the contrary, if the enclosure 3 is open because at least one of its portions have been removed or damaged, then the receiver 8 is able to receive the radiation transmitted by the transmitter 7. Analyzing the received radiation 11 thus makes it possible to detect the closure, the presence, and the integrity of the enclosure 3. On this principle, a detection module capable of analyzing the radiation 11 received by the receiver 8 may thus be constructed and may be suitable for detecting an intrusion as soon as significant radiation 11 is received.

Said radiation may be of any type, being suitable for being transmitted without contact between a transmitter and a receiver. By way of example, it may be light radiation, RF radiation, or indeed ultrasound radiation.

In a conventional embodiment, the electronic component 2 is placed on a substantially plane support 9, typically a printed circuit 9. In one embodiment, the enclosure 3 that completely surrounds said at least one electronic component 2 advantageously comprises a box 31 of arbitrary shape that is closed on all of its sides with the exception of one remaining face. The remaining face is a substantially plane face and corresponds to the support 9. It is then possible to arrange the box 31 with its open face pressed against the support 9. The box 31 thus encloses the electronic component 2 and its remaining face is closed by the support 9.

In order to implement the above-described principle, it is appropriate for the enclosure 3 to be closed to said radiation in order to be proof against said radiation. This closure, in the radiation sense, depends on the type of radiation.

Thus, for optical radiation, a closure device is used that is opaque to the light being used.

For RF radiation, closure assumes that the enclosure 3 comprises a metal covering that is continuous or at least latticework with a mesh size appropriate for the frequencies contained in the RF signal 11. For this purpose, the box 31 is made of metal. Alternatively, the box 31 may be made of a metal-plated insulating material. Metallic continuity within the support 9 is advantageously achieved by a ground plane 32 covering at least the entire area of the footprint of the box 31. Advantageously, the box 31 and said ground plane 32 are electrically connected together so as to be at the same electric potential. Thus, the enclosure 3 is formed by the box 31 that covers the electronic component 2 from above and by the ground plane 32 that is arranged under the electronic component 2.

It is thus not possible to come into contact with the electronic component 2 without encountering the enclosure 3.

In an embodiment, the box 31 may comprise a frame 33 fastened to the support 9 and on which a lid 34 is engaged. Thus, the box 31 may be opened in order to access the electronic component 2. Such opening is detected by the invention.

Figure 4:
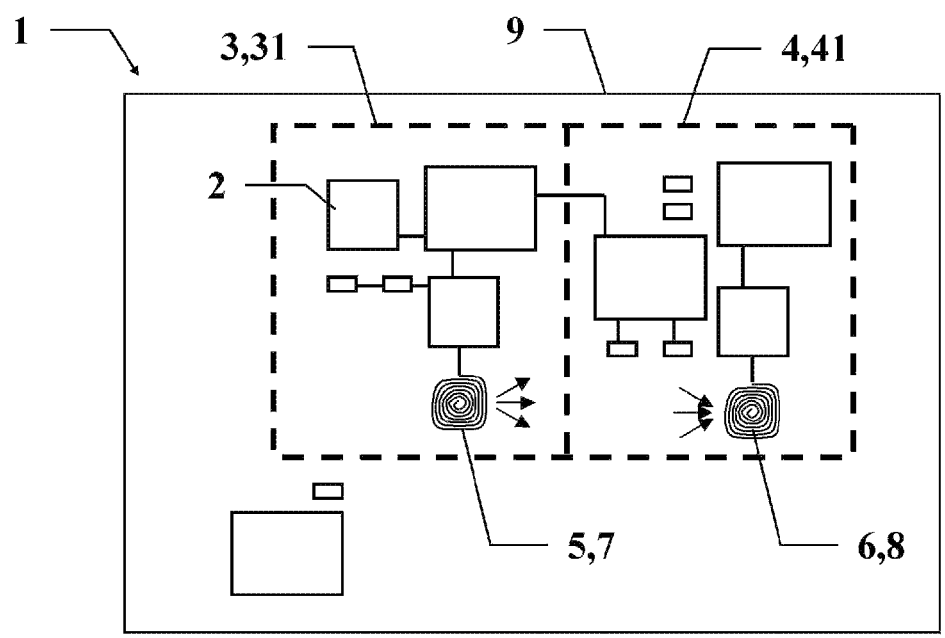

As mentioned above, a piece of equipment 5, a transmitter or a receiver, is arranged inside the enclosure 3 and the other piece of equipment 6 that is complementary, i.e. a receiver or a transmitter, is arranged outside the enclosure 3 enclosing the electronic component 2. In an embodiment that is shown more particularly in FIG. 4, the equipment 6 that is arranged outside the enclosure 3, referred to below as the "first" enclosure 3, is arranged inside a second enclosure 4, that is separate from the first enclosure 3. This second enclosure 4 comprises a second box 41 secured to the first box 31. Each of the two boxes 31 and 41 encloses electronic components. They are secured to each other in the sense that they form a single block. Thus, opening or closing either one of the boxes 31 and 41 necessarily takes place simultaneously with opening or closing the other box 41 or 31.

According to an advantageous characteristic of the invention, when the radiation is RF radiation, a box 31, 41 is not made specifically for the invention for the purpose of constituting a screen between the first and second pieces of equipment 5 and 6, but advantageously use is made of an existing box for providing protection against electromagnetic radiation. Such a metal box 31, 41 is commonly used to protect the electronic component 2 from various waves and types of electromagnetic radiation present in their environment, regardless of whether the waves are functional and wanted, being associated with RF functions, or unwanted and associated with electromagnetic disturbances. Thus, by way of example, for an electronics card of a mobile terminal, such as a cell phone, for example, certain sensitive electronic components need to be protected against various other pieces of RF equipment situated nearby, such as for example a transmitter for the global system for mobile communication (GSM), or WiFi, or Bluetooth. A metal box combined with and connected to a ground plane is then used to form a Faraday cage surrounding said electronic component 2. This Faraday cage forms an enclosure 3 that is proof against electromagnetic radiation and that also provides protection against physical access to the electronic component 2 that is protected in this way. Advantage is advantageously taken of these two properties by reusing this existing box 31. The at least two pieces of equipment of the invention, specifically pieces of radiofrequency equipment 5 and 6, for detecting the presence of the screen that is proof against electromagnetic radiation and that has not been deteriorated, and thus for detecting the presence and the non-deterioration of the physical protection, thus serves to guarantee that the electronic component is not accessible.

Detecting that the physical protection has been removed or damaged in the manner proposed takes place invisibly and silently. Thus, this detection may advantageously be performed without the intruder or the would-be intruder being made aware of the detection or being informed about it.

The invention as described requires at least one transmitter 7 and at least one receiver 8 tuned to said transmitter 7. Nevertheless, it is possible to use an arbitrary numbers of transmitters 7 and of receivers 8, which numbers need not be the same.

If a plurality of transmitters 7 and a plurality of receivers 8 are used, it is also possible to cross transmitter/receiver pairs by distinguishing sufficiently between the frequencies and/or modulations used. Thus, by way of example, it is possible to have a transmitter 7 and a receiver 8 inside the enclosure 3 that are not in tune with each other, but that are tuned respectively to a receiver 8 and a transmitter 7 that are arranged outside the enclosure 3.

If the environment of the electronic component 2 makes this possible, insofar as the environment has an existing transmitter 7, then the transmitter 7 may advantageously be reused by the device 1 of the invention. Thus, assuming that at least one transmitter 7 preexists outside the enclosure 3, the device 1 of the invention may be implemented by adding at least one piece of equipment 5 inside the enclosure 3. Under such circumstances, said piece of equipment 5 is necessarily a receiver 8 that is tuned to said at least one preexisting transmitter 7.

Figure 5:
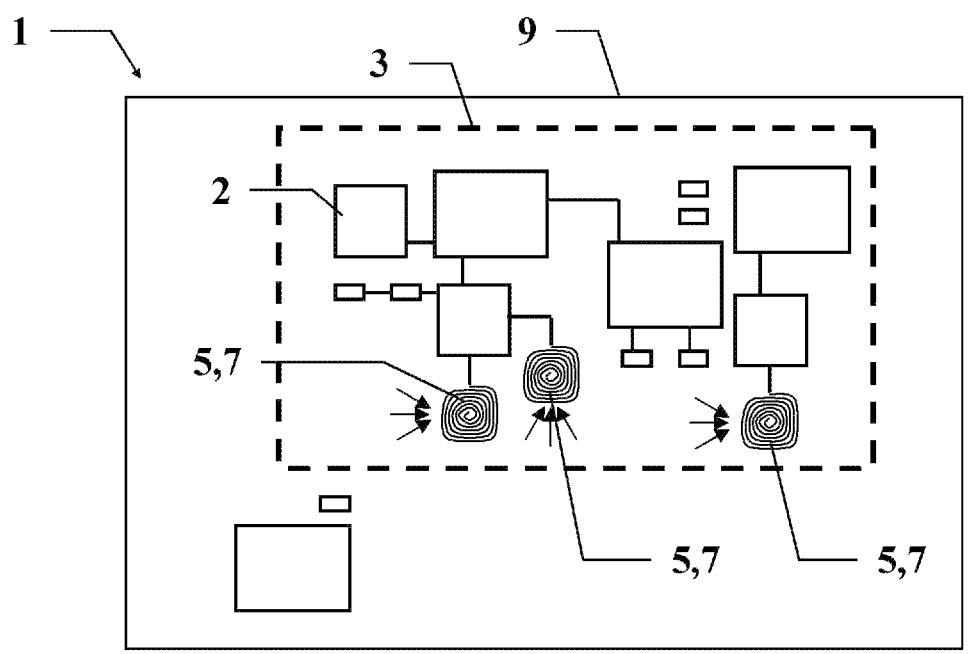

Such a situation may be encountered, for example, with an electronic component 2 that is situated on an electronics card of a cell phone. Several pieces of transmitter equipment 7 may be encountered, specifically RF transmitters. Thus, in such an environment, it is possible to reuse a preexisting GSM, WiFi, or indeed Bluetooth transmitter. Under such circumstances, the device 1 of the invention adds a GSM receiver, a WiFi receiver, or a Bluetooth receiver in order to detect an intrusion. Alternatively, the device 1 of the invention may add in combination two or three receivers selected from a GSM receiver, a WiFi receiver, and a Bluetooth receiver. This is shown more particularly in the embodiment of FIG. 5, where the device 1 shown does not have a transmitter 7, in that it reuses at least one existing transmitter, but does have three receivers 8, that may be tuned to a single type of transmitter, or to three different types of transmitter.

The presence of an existing RF transmitter usually leads to protecting a sensitive electronic component 2 by a metal box. Thus, the combined presence of an existing transmitter and of an existing enclosure that are both suitable for reuse corresponds to a situation that is very frequent in practice.

Figure 6:
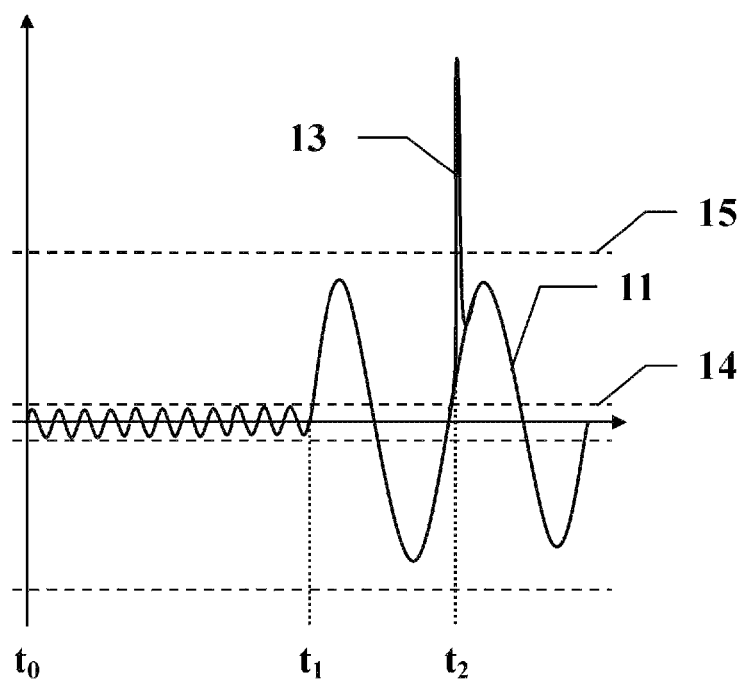
FIG. 6 shows radiation received by a receiver.

With reference to FIG. 6, there follows a more particular description of the principle of detection. The detection module of the device 1 analyzes the radiation 11 received by one of the receivers 8. An illustrative example of such radiation 11 is shown in the time plot of FIG. 6.

In an initial stage, extending from instant $t_0$ to instant $t_1$, the amplitude of the received radiation 11 is low, and in any event lower in absolute value than a first threshold 14. This first threshold 14 is low and serves to eliminate reception noise, if any. Ignoring noise, it may be considered that the radiation 11 is zero and that no radiation and therefore no signal is received coming from any of the transmitters 7 to which the receiver 8 under analysis is tuned. It may thus be concluded that the enclosure 3 is closed and no intrusion is to be regretted.

As from instant $t_1$, the amplitude of the received radiation 11 increases considerably, so as to become greater than the first threshold 14 for noise. It is then considered that the received radiation 11 is significant, and constitutes radiation 11 that is deemed to have come from one of the transmitters 7 to which the receiver 8 under analysis is tuned. It can then be concluded that the enclosure 3 is open: either removed or damaged; and that an intrusion has taken place.

So long as the amplitude of the received radiation 11 remains less than a second threshold 15, it can reasonably be concluded that the received radiation 11 is radiation from one of the transmitters 7 to which the receiver 8 under analysis is tuned. In order to be pertinent, this second threshold 15 is determined in such a manner as to correspond to the greatest amplitude of radiation transmitted by one of the transmitters 7 to which the receiver 8 under analysis is tuned, as seen by said receiver 8. This second threshold 15 is thus no greater than said greatest amplitude. It may advantageously be reduced as a function of known or estimated amounts of attenuation.

In contrast, if the amplitude of the received radiation 11 becomes greater than the second threshold 15, as at instant $t_2$, e.g. presenting a peak 13, it may be concluded that some other transmitter, one that is not normally included in the environment of the device 1, is present. Furthermore, if a receiver 8 under analysis is inside the enclosure 3, it is to be feared that the enclosure 3 has been opened.

It can thus be seen that there are two situations that can be distinguished. If the amplitude of the received radiation 11 is greater than a first threshold 14 corresponding to noise, but remains less than the second threshold 15, then it may reasonably be concluded that the enclosure 3 is open. Such circumstances can be referred to as an intrusion of penetration type.

If the amplitude of the received radiation 11 becomes greater than the second threshold 15, even for only a short instant, it may reasonably be concluded that an external transmitter is present. It may then reasonably be assumed that that transmitter is a pirate transmitter being used to carry out an attack against an electronic component 2 by laser or RF pulses, also known as EMFA in the RF situation. Under such circumstances, the intrusion may be referred to as being of pulse attack type. Furthermore, if the receiver 8 under analysis is inside the enclosure 3, this also reveals that the enclosure 3 has been opened.

A protection device 1 may do no more than detect. Nevertheless, in order to protect the electronic component 2, it is appropriate at the least to trigger a warning device suitable for indicating that an intrusion has taken place. Nevertheless, for best effectiveness, it is preferable for detection to be followed by conservation action, preferably action that is applied directly to the electronic component 2.

As a function of the intrusion that is detected and of its type, the protection device 1 may take one or more conservation measures in order to provide effective protection for the electronic component 2. For this purpose, the device 1 advantageously includes an action module suitable for performing one or more conservation measures.

Thus, a first level of conservation measure may be performed if an intrusion of the penetration type is detected. A conservation measure taken as a result of detecting an intrusion of the penetration type is preferably reversible. This makes it possible to accommodate the situation in which the enclosure 3 is opened for reasons that are authorized, e.g. for maintenance. Thus, a first level conservation measurement may consist in switching off the electronic component 2 so that it becomes more difficult to spy upon.

A second level of conservation measure may be undertaken, where appropriate, for the purpose of further reinforcing the security provided by a first level measure, in the event of an intrusion of the pulse attack type being detected. Under such circumstances, dishonesty is much more probable. It may then be envisaged to take a conservation measure that is definitive and irreversible. A conservation measure at the second level may consist in destroying the electronic component 2, or indeed in deleting sensitive data.

The invention claimed is:

1. A device for providing protection against intrusion in order to protect at least one electronic component, the device comprising:
   a first enclosure surrounding the electronic component and proof against at least one type of radiation,
   at least one piece of equipment selected from a receiver and a transmitter of radiation of said type arranged inside the first enclosure, and substantially tuned to another piece of equipment that is complementary and selected from a receiver and a transmitter, arranged outside the first enclosure, and
   a detection module suitable for detecting an intrusion if at least one receiver receives radiation of said type.

2. A device according to claim 1, wherein the type of said radiation comprises at least one type selected from light radiation, radiofrequency radiation, and ultrasound radiation.

3. A device according to claim 1, wherein the first enclosure comprises a first box that is closed to said radiation on all of its faces except for a remaining face, said remaining face being closed to said radiation by a plane support.

4. A device according to claim 3, wherein the radiation is radio-frequency radiation and wherein the support comprises a ground plane at the same potential as the first box.

5. A device according to claim 3, wherein the equipment arranged outside the first enclosure is itself arranged inside a second enclosure that comprises a second box secured to the first box.

6. A device according to claim 5, wherein the first box and/or the second box provides protection against electromagnetic radiation.

7. A device according to claim 1, wherein the equipment arranged inside the first enclosure is a receiver that is substantially tuned to a preexisting transmitter in the environment of the electronic component and outside the first enclosure.

8. A device according to claim 1, wherein the detection module is suitable for detecting an intrusion of penetration type if the at least one receiver receives radiation of amplitude greater than a first threshold for noise.

9. A device according to claim 1, wherein the detection module is suitable for detecting an intrusion of penetration type if the at least one receiver receives radiation of amplitude less than the amplitude of radiation transmitted by a transmitter.

10. A device according to claim 1, wherein the detection module is suitable for detecting an intrusion of pulse attack type if the at least one receiver receives radiation of amplitude greater than the amplitude of radiation transmitted by a transmitter.

11. A device according to claim 10, further including an action module, suitable for taking a first conservation measure if an intrusion of penetration type is detected.

12. A device according to claim 11, wherein the action module is also suitable for taking a second conservation measure if an intrusion of electromagnetic attack type is detected.

13. Electronic equipment including a device for providing protection against intrusion according to claim 1.

14. Electronic equipment according to claim 13, wherein the electronic equipment is a mobile terminal.

* * * * *